United States Patent
Briancourt

(10) Patent No.: US 7,287,726 B2
(45) Date of Patent: Oct. 30, 2007

(54) LANDING GEAR DOOR ASSEMBLY

(75) Inventor: Stephen P Briancourt, Filton (GB)

(73) Assignee: Airbus UK Limited, Bristol (GB)

( * ) Notice: Subject to any disclaimer, the term of this patent is extended or adjusted under 35 U.S.C. 154(b) by 111 days.

(21) Appl. No.: 10/511,848

(22) PCT Filed: Mar. 28, 2003

(86) PCT No.: PCT/GB03/01387

§ 371 (c)(1),
(2), (4) Date: Oct. 19, 2004

(87) PCT Pub. No.: WO03/089297

PCT Pub. Date: Oct. 30, 2003

(65) Prior Publication Data

US 2005/0103937 A1    May 19, 2005

(30) Foreign Application Priority Data

Apr. 19, 2002   (GB)   .................... 0208963.9

(51) Int. Cl.
*B64C 25/10* (2006.01)
(52) U.S. Cl. ................................. 244/102 R
(58) Field of Classification Search ........... 244/102 R, 244/100 R, 129.1, 129.4, 129.5
See application file for complete search history.

(56) References Cited

U.S. PATENT DOCUMENTS

| 2,180,462 | A |   | 11/1939 | DeSeversky |           |
|-----------|---|---|---------|------------|-----------|
| 2,406,710 | A | * | 8/1946  | Ramey et al. | 244/102 R |
| 2,457,625 | A | * | 12/1948 | Amiot      | 244/129.5 |
| 2,548,832 | A |   | 4/1951  | Walter     |           |
| 2,604,281 | A | * | 7/1952  | Buchal et al. | 244/129.5 |
| 2,921,501 | A | * | 1/1960  | Parot      | 89/1.51   |
| 2,921,759 | A | * | 1/1960  | Elkin et al. | 244/102 R |
| 2,941,756 | A | * | 6/1960  | Roberts    | 244/102 R |
| 2,963,246 | A | * | 12/1960 | Mitrovich  | 244/102 R |
| 3,156,439 | A | * | 11/1964 | Fleury     | 244/102 R |
| 3,174,712 | A | * | 3/1965  | Ricard     | 244/129.5 |
| 3,372,892 | A | * | 3/1968  | Poncia et al. | 244/102 R |

(Continued)

FOREIGN PATENT DOCUMENTS

EP    1 129 938    9/2001

(Continued)

OTHER PUBLICATIONS http://en.wikipedia.org/wiki/F-117_Nighthawk available Jun. 22, 2004.*

(Continued)

*Primary Examiner*—Frank Palo
*Assistant Examiner*—Joseph W Sanderson
(74) *Attorney, Agent, or Firm*—Nixon & Vanderhye P.C.

(57) ABSTRACT

An aircraft landing gear door assembly has a plurality of doors. The doors include a first door (1) mounted for rotational movement between closed and open positions about a first generally longitudinal axis (11) and a transverse door (3) mounted for rotational movement between closed and open positions about a generally horizontal axis (13) that is transverse to the longitudinal axis (11). The provision of the transverse door (3) can allow the length of the first door (1) to be reduced from that which would otherwise be required to allow passage of the landing gear.

18 Claims, 9 Drawing Sheets

U.S. PATENT DOCUMENTS

| | | | | |
|---|---|---|---|---|
| 4,412,665 A | * | 11/1983 | Kramer et al. | 244/102 R |
| 4,638,962 A | * | 1/1987 | Gunter et al. | 244/203 |
| 4,845,804 A | * | 7/1989 | Garrett | 16/19 |
| 5,692,703 A | * | 12/1997 | Murphy et al. | 244/102 R |
| 6,213,428 B1 | * | 4/2001 | Chaumel et al. | 244/119 |
| 6,345,786 B1 | * | 2/2002 | Sakurai | 244/102 R |
| 6,345,787 B1 | * | 2/2002 | Tighe et al. | 244/102 R |
| 6,352,221 B1 | * | 3/2002 | Sakurai | 244/102 R |
| 6,811,116 B1 | * | 11/2004 | Briancourt | 244/102 R |
| 2006/0060707 A1 | * | 3/2006 | Chow et al. | 244/129.4 |

FOREIGN PATENT DOCUMENTS

| | | |
|---|---|---|
| GB | 537 234 | 6/1941 |
| GB | 756 111 | 8/1956 |
| GB | 756111 | 8/1956 |
| GB | 847382 | 9/1960 |
| WO | WO 01/56878 | 8/2001 |

OTHER PUBLICATIONS http://www.richard-seaman.com/Aircraft/AirShows/Riat2002/F117/index.html website available October 25, 2003.*

"Farnborough International 94 The Official Programme" 1994, p. 78.

* cited by examiner

LANDING GEAR DOOR ASSEMBLY

This application is the U.S. national phase of international application PCT/GB03/01387, filed 28 Mar. 2003, which designated the U.S. and claims priority to GB Application No. 0208963.9 filed 19 Apr. 2002. The entire contents of these applications are incorporated herein by reference.

The present invention relates to an aircraft landing gear door assembly.

A landing gear of an aircraft is typically movable between a deployed position, where the landing gear extends downwardly from the aircraft and wheels of the landing gear can engage a runway, and a stored position where the landing gear is accommodated within appropriately shaped bays in the aircraft's fuselage or wing. So as not to interfere with the overall aerodynamic properties of the aircraft in flight, the bays are provided with doors which, when closed, conform to the shape of the aircraft body.

In a known landing gear door assembly, a pair of doors are provided. In the closed position of the doors the opening or aperture of the bay accommodating the landing gear is closed across by the doors with adjacent edges of the doors extending along a generally longitudinal axis spanning the aperture. Each door is hinged about a generally horizontal and longitudinal axis in the region of the edge of the door opposite to the edge adjoining the other door, allowing the doors to be rotated downwardly about the axes to open positions in which the doors extend approximately vertically downwardly from the aircraft body. It will be understood that references to the horizontal and vertical and the like, refer to a situation where the aircraft is at rest on a horizontal runway.

The size of the pair of doors depends upon the size of the aperture that the doors must close over and the aperture must in turn be sufficiently large to allow passage of the landing gear during deployment. As a result, if the landing gear is relatively large the doors must in turn be relatively large. Especially in the case of large aircraft, it may be desirable to have landing gears deployed in close proximity to one another. In such a case, however, it is important that the doors associated with one landing gear do not interfere with the deployment of an adjacent landing gear. Thus the size of a door, even when fully open, may need to be limited to avoid interference with an adjacent landing gear.

It is an object of the invention to provide an aircraft landing gear door assembly that overcomes or mitigates the problems referred to above and in particular enables a relatively large aperture to be provided when the doors are open without the doors interfering with an adjacent landing gear.

According to the invention there is provided an aircraft landing gear door assembly including a plurality of doors moveable between open positions, in which landing gear can be deployed through an aperture, and closed positions, in which the doors are closed across the aperture, the plurality of doors including a first door mounted for rotational movement between closed and open positions about a first generally longitudinal axis and a transverse door mounted for rotational movement between closed and open positions about a generally horizontal axis that is transverse to the first generally longitudinal axis.

The provision of a transverse door allows the length of the first door to be reduced from that which would otherwise be required to allow passage of the landing gear. Such reduction in the length of the first door may avoid the first door interfering with the deployment of a neighboring landing gear as well as being advantageous from an aerodynamic or noise viewpoint.

Reference is made to a "generally" longitudinal axis to signify that the axis is in a direction generally aligned with the longitudinal axis of the aircraft fuselage, rather than being transverse thereto. It is not, however, essential for the axis of rotation to be precisely aligned with the longitudinal axis of the aircraft fuselage and indeed in particular cases it may be preferred that the axis of rotation is at an acute angle to the longitudinal axis.

Reference is made to a "transverse" door merely because the door is one mounted for rotational movement about a generally horizontal axis that is transverse to the first generally longitudinal axis. Whilst in a preferred embodiment of the invention, the longest dimension of the transverse door is in a direction transverse to the first generally longitudinal axis this need not be so; for example, it is possible for the length of the transverse door measured along the longitudinal axis to be greater than its width measured along its transverse axis of rotation.

The first door is preferably mounted for fixed-axis rotational movement about the first generally longitudinal axis. The transverse door is preferably mounted for fixed-axis rotational movement about the transverse generally horizontal axis. Whilst it is possible for a door to be mounted such that its movement is a complex combination of translational and rotational movements, fixed-axis rotation provides a simple and reliable design.

The assembly preferably further includes a linkage mechanism and a prime mover. The linkage mechanism preferably connects the plurality of doors to the prime mover such that the prime mover is effective to operate all the plurality of doors. In that way synchronized movement of the doors can be assured. The prime mover preferably comprises a linear actuator, one stroke of the actuator in one direction being effective to move the doors from the closed positions to the open positions and one stroke of the actuator in the opposite direction being effective to move the doors from the open positions to the closed positions.

Preferably the transverse door is disposed at least mostly above the aperture in its open position. It is preferred that all of the transverse door is disposed above the aperture in its open position. By raising the transverse door as it opens, it is possible to keep the transverse door entirely within the landing gear bay and therefore avoid undesirable aerodynamic effects and/or noise. On the other hand, the first door preferably projects downwardly from the aperture in its open position.

The transverse door may be fore or aft of the first door but is aft of the first door in a preferred embodiment of the invention described below.

In a particularly preferred embodiment of the invention, the plurality of doors include a second door moveable between closed and open positions, the second door being adjacent to the first door in the closed positions of the doors, the first door being so mounted that its rotational movement from its closed position to its open position involves movement of at least part of the first door through space which is occupied by the second door in its closed position and vacated by the second door in its open position. By providing a second door which when open allows the first door to move through space which would otherwise have been blocked, it becomes possible to mount the first door in a way that would not otherwise be possible. The first door can be arranged such that its outer longitudinal edge moves upwardly and outwardly as the door moves from its closed to its open position. Thus in the open position of the first door the uppermost part of the door may be raised significantly from its position when the door is closed, whereby the door projects less far downwardly in its open position than would be the case if the outer longitudinal edge of the door were hinged about a generally horizontal and longitudinal axis passing through the edge of the door. The second door is preferably mounted for fixed-axis rotational movement about a second generally longitudinal axis. The first generally longitudinal axis is preferably disposed at a location vertically spaced above the level of the opening and also preferably disposed in a region overlying the locations of adjacent edges of the first and second doors when they are closed. By positioning the first generally longitudinal axis at a location vertically spaced above the level of the opening, the first door can readily be arranged to be raised and to enter partway into the bay as the first door is opened. The lateral movement of the first door can be accommodated by the simultaneous opening of the second door.

In a conventional door assembly it is common for a pair of doors to be provided. According to the present invention, the plurality of doors preferably includes a third door mounted for rotational movement between closed and open positions about a third generally longitudinal axis which is preferably a fixed axis, the first and third doors defining a pair of doors on opposite sides of the aperture. The plurality of doors preferably further includes a fourth door moveable between closed and open positions, the fourth door being adjacent to the third door in the closed positions of the doors, the third door being so mounted that its rotational movement from its closed position to its open position involves movement of at least part of the first door through space which is occupied by the fourth door in its closed position and vacated by the fourth door in its open position. The third door is preferably mounted for fixed-axis rotational movement about a third generally longitudinal axis, which is preferably disposed at a location vertically spaced above the level of the aperture and, preferably, in a region overlying the locations of adjacent edges of the third and fourth doors when they are closed. The fourth door is preferably mounted for fixed-axis rotational movement about a fourth generally longitudinal axis. Whilst reference is made to third and fourth doors, it should be understood that it is within the scope of the invention to provide a door assembly including the third door or both the third and fourth doors without these being the door referred to herein as the second door.

The invention also provides an aircraft including a landing gear door assembly as described herein. The aircraft may include a further landing gear which when deployed is adjacent to one end of the first door when in its open position, the transverse door being disposed adjacent to said one end of the first door when the doors are in their closed positions. In such a case, if the transverse door were instead part of the first door, the first door would interfere with the adjacent landing gear when that gear was deployed and the first door was in its open position. The provision of the separate transverse door avoids such interference.

By way of example, a landing gear door assembly embodying the invention will now be described with reference to the accompanying drawings, of which:

Figure 1A:
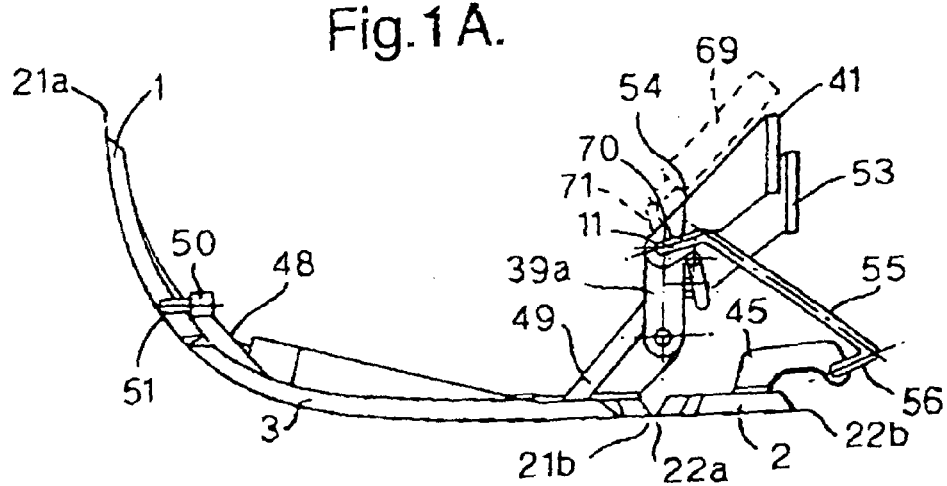
FIG. 1A is a rear view of the landing gear door assembly in a closed position.

The doors of the door assembly of the embodiment described herein are movable between an open position, wherein a single landing gear may pass out of or into the relevant landing gear bay of the aircraft and a closed position, wherein the landing gear is stored in the bay and the doors conform to the shape of the surrounding part of the aircraft.

The structure and operation of the door assembly will be described by referring firstly to the doors, the axes about which they are arranged to rotate and the positions that they occupy in the open and closed positions. Thereafter the mountings and linkages that achieve the desired movements will be described.

The door assembly shown includes three doors: a first door 1, a second door 2, and a door 3. The first door 1 is mounted for rotation about a first longitudinal axis 11. The second door 2 is mounted for rotation about a second longitudinal axis 12, parallel to the axis 11. The door 3, referred to herein, as a transverse door, is mounted for rotation about an axis 13 that is substantially horizontal and substantially perpendicular to the longitudinal axes 11 and 12.

Each door is mounted with only one degree of freedom, namely rotation about a fixed axis. Each of the doors is, however, rotatable about an axis spaced from any part of the door and therefore rotation of each door about its respective axis of rotation as it moves between its open and closed positions causes both a change in the orientation of the door and a displacement of the door as will now be further described. The configuration of the three doors 1, 2, 3, when closed, is shown schematically in FIG. 1E.

Figure 1B:
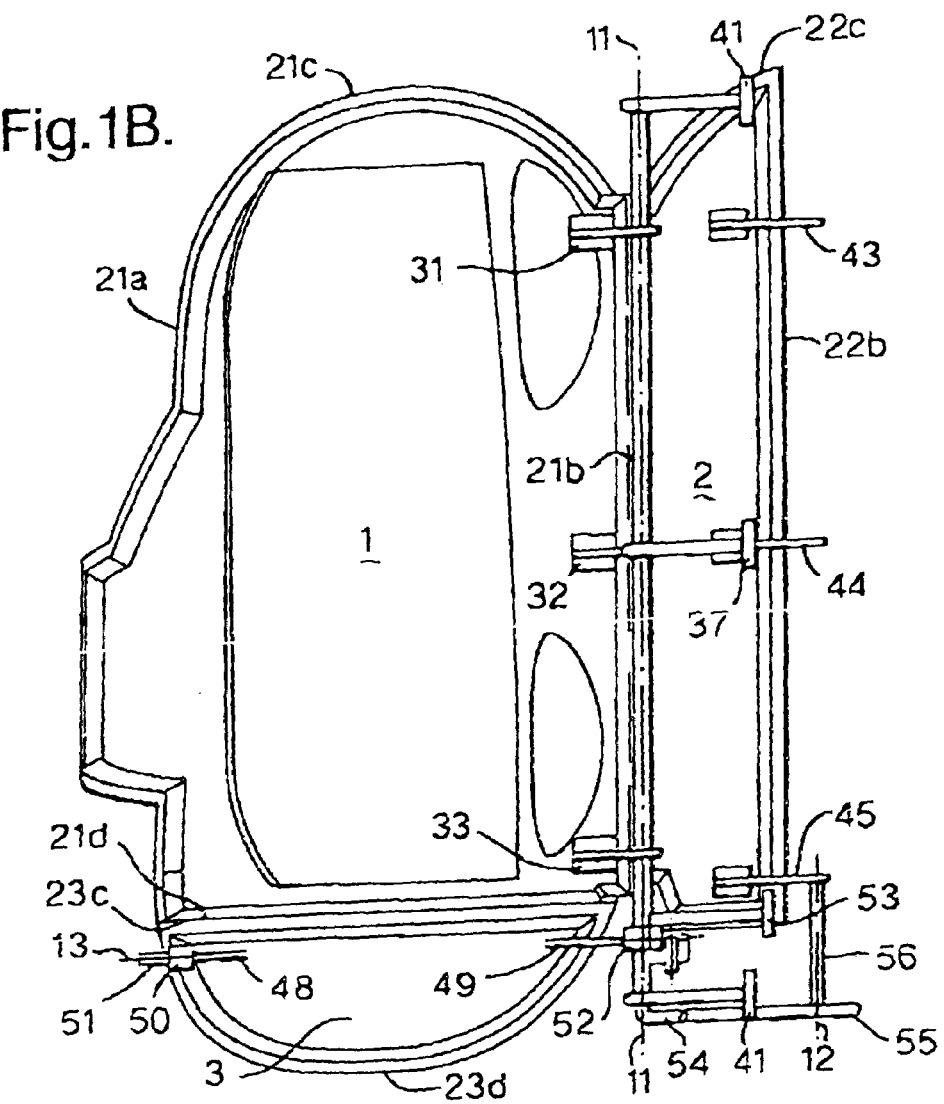
FIG. 1B is a plan view of the landing gear door assembly in the closed position.
Figure 1C:
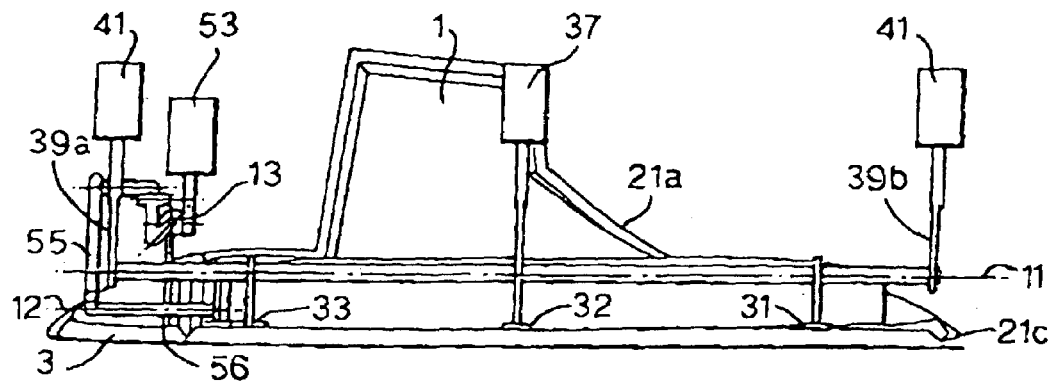
FIG. 1C is a side view of the landing gear door assembly in the closed position.
Figure 1D:
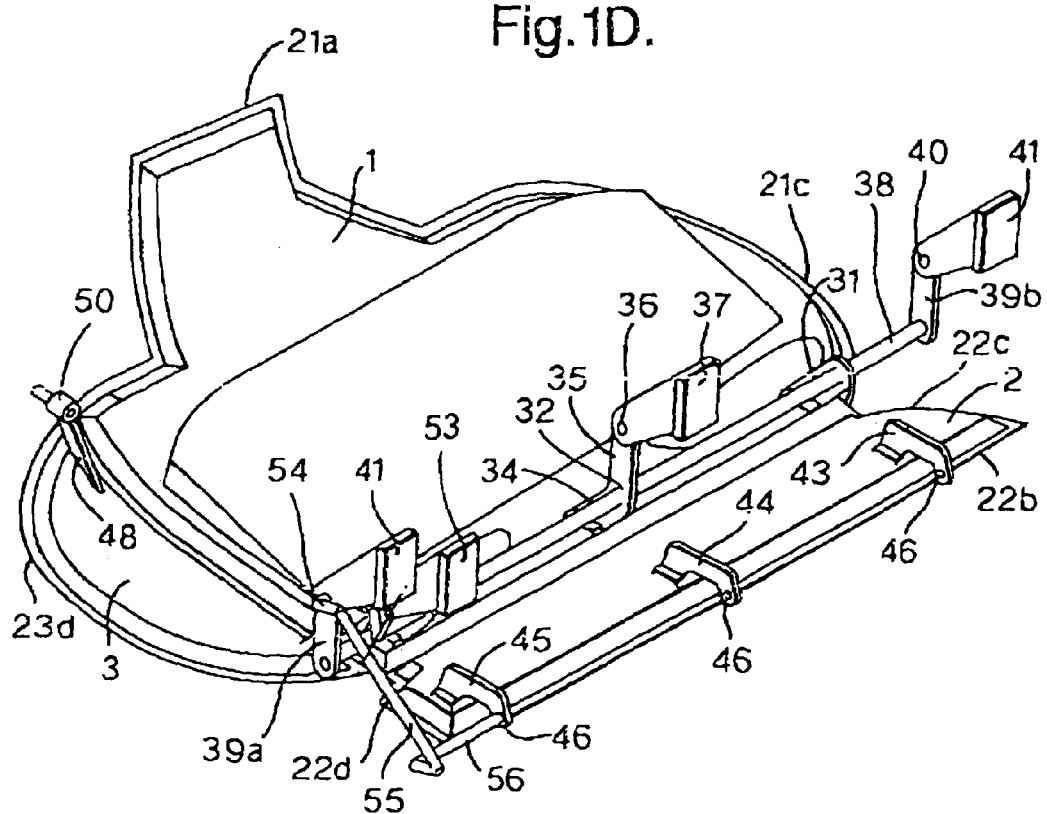
FIG. 1D is a perspective view from above and to the side and rear of the landing gear door assembly in the closed position.
Figure 1E:
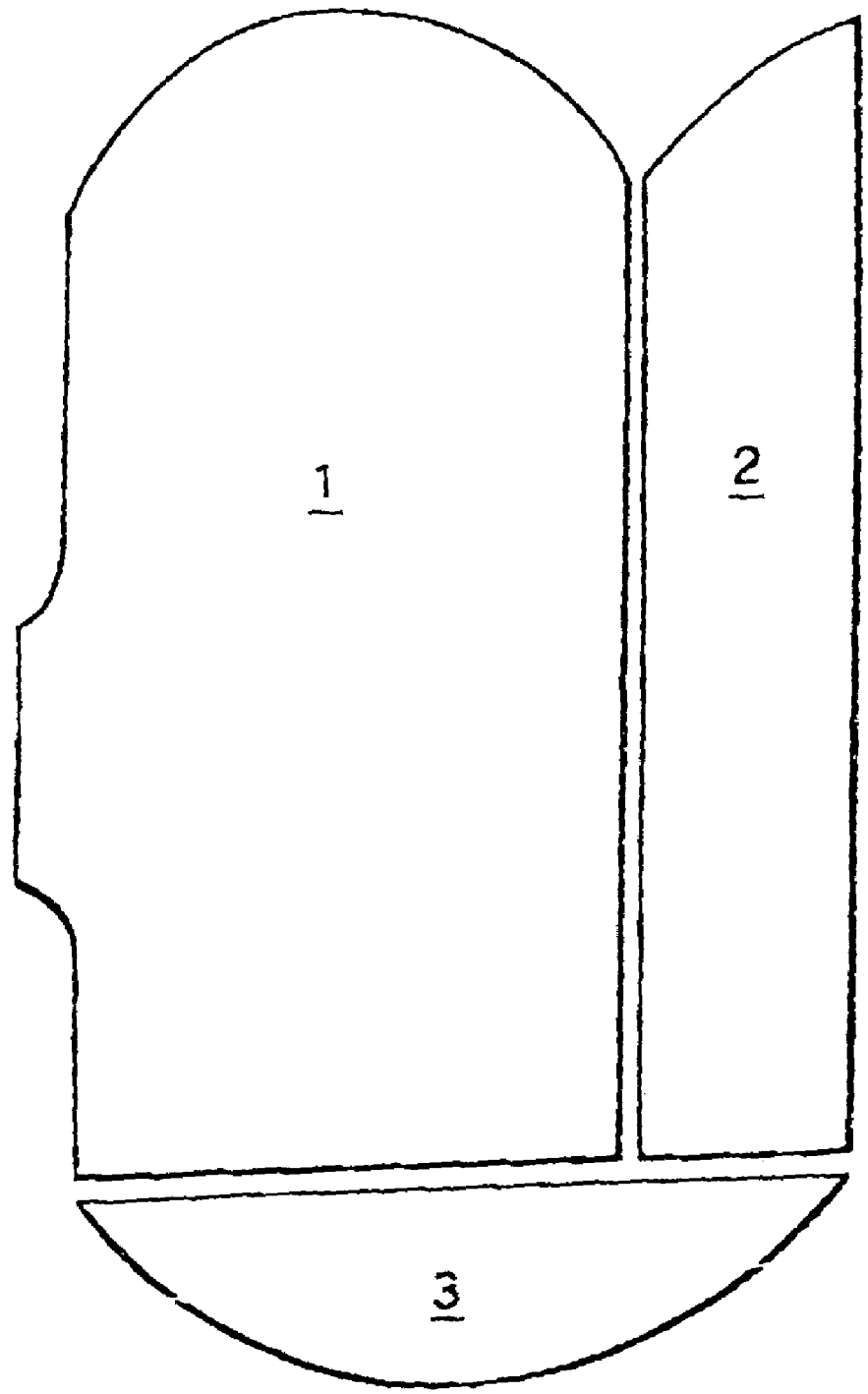
FIG. 1E is a diagrammatic plan view of the door assembly, showing the assembly in a closed position.

Referring to FIGS. 1A to 1E, and especially to FIG. 1B, it may be seen that the first door 1 is bounded by longitudinal side edges 21a and 21b, a curved fore edge 21c and a straight aft edge 21d. The second door 2 is of similar length to the first door 1 and is bounded by longitudinal side edges 22a and 22b and fore and aft edges 22c and 22d. The side edge 21b of the first door 1 lies immediately adjacent to, and is of similar length to, the side edge 22*a* of the second door 2 when the doors are closed. The transverse door 3 is of much shorter length than the doors 1 and 2 and of very approximately semi-circular shape. The transverse door 3 is defined by a straight fore edge 23*c*, immediately adjacent to and of similar length to the aft edge 21*d* of the first door, and a curved edge 23*d* of very approximately semi-circular shape. As can be seen in FIG. 1B the doors 1 and 3 when closed together define an approximately oval shape with the door 2 providing an extension to that shape on one side. It will be understood that in their closed positions shown in FIGS. 1A to 1E, the three doors 1, 2, 3 fill the aperture (or as explained below one half of the aperture) through which landing gear is to be deployed and the shape of that aperture in the described embodiment is therefore the shape defined by the outer edges of the doors 1, 2 and 3 in FIGS. 1A to 1E.

The movement of the doors 1, 2 and 3 from their closed positions to their open positions is effected by one linkage connected to all three doors so that their movement is simultaneous. In the description below, the movement of each door is described in turn in the interests of clarity.

Figure 2A:
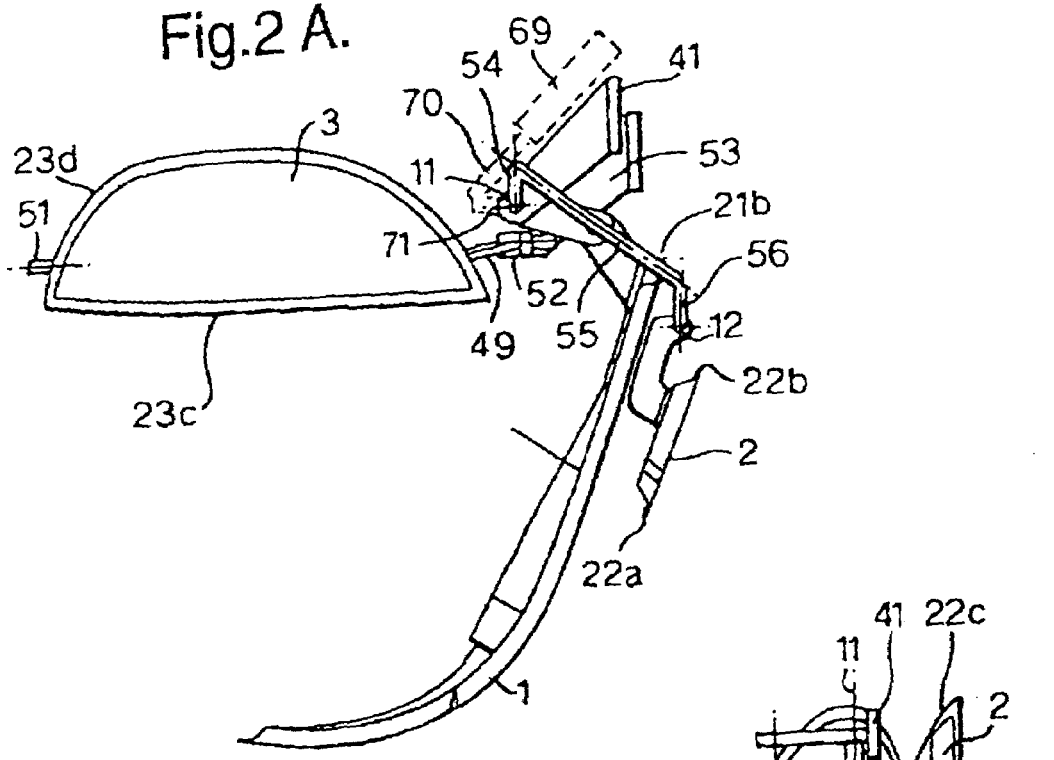
FIG. 2A is a rear view of the landing gear door assembly, similar to FIG. 1A but showing the assembly in an open position.
Figure 2B:
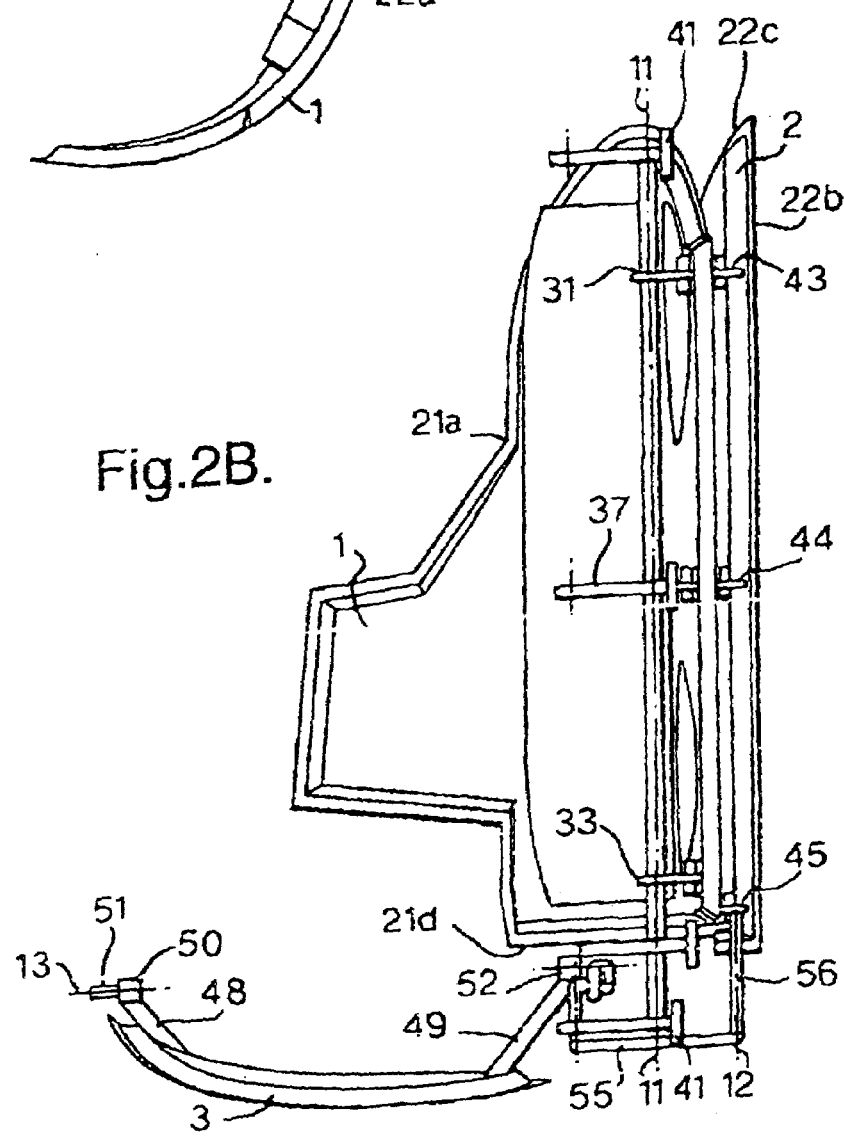
FIG. 2B is a plan view of the landing gear door assembly, similar to FIG. 1B but showing the assembly in an open position.

As can be seen in FIG. 1A, the fixed axis of rotation 11 of the first door 1 is spaced a distance above the door and at a position directly overlying the edge 21*b* of the first door. As can be seen by comparing the orientation of the door 1 in FIGS. 1A and 2A, the door rotates through an angle of about 75 degrees when moving from its closed to its open position. Consequently the edge 21*b* of the first door 1 moves to the right (as seen in FIG. 1A) as the door begins to open and also moves upwardly especially towards the end of its path of movement. Thus in the open position of the door 1, the top edge 21*b* of the door is above its closed position and to the right (as seen in FIG. 1A) of its closed position.

The fixed axis of rotation 12 of the second door 2 is slightly above and to the right (as seen in FIG. 1A) of the edge 22*b* of the second door. As can again be seen by comparing the orientation of the door in FIGS. 1A and 2A, the door rotates through an angle of about 75 degrees when moving from its closed position to its open position. The second door 2 therefore moves to the right as it opens with only slight upward movement of the top edge 22*b* of the door.

It should also be observed that, if the second door 2 were to remain in its closed position, it would be impossible for the first door 1 to move from its closed position to its open position because such movement involves passing through the space occupied by the second door 2 when in its closed position. As already indicated, however, the second door 2 opens in synchronism with the first door 1 and at no stage blocks the opening of the first door 1.

Figure 2C:
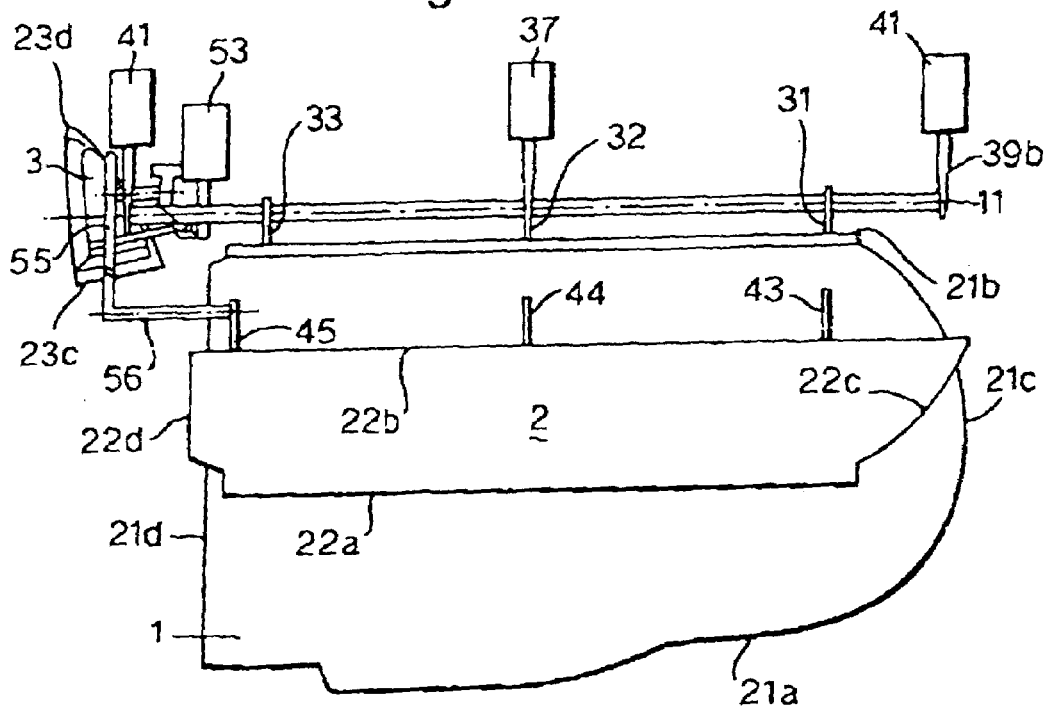
FIG. 2C is a side view of the landing gear door assembly, similar to FIG. 1C but showing the assembly in an open position.
Figure 2D:
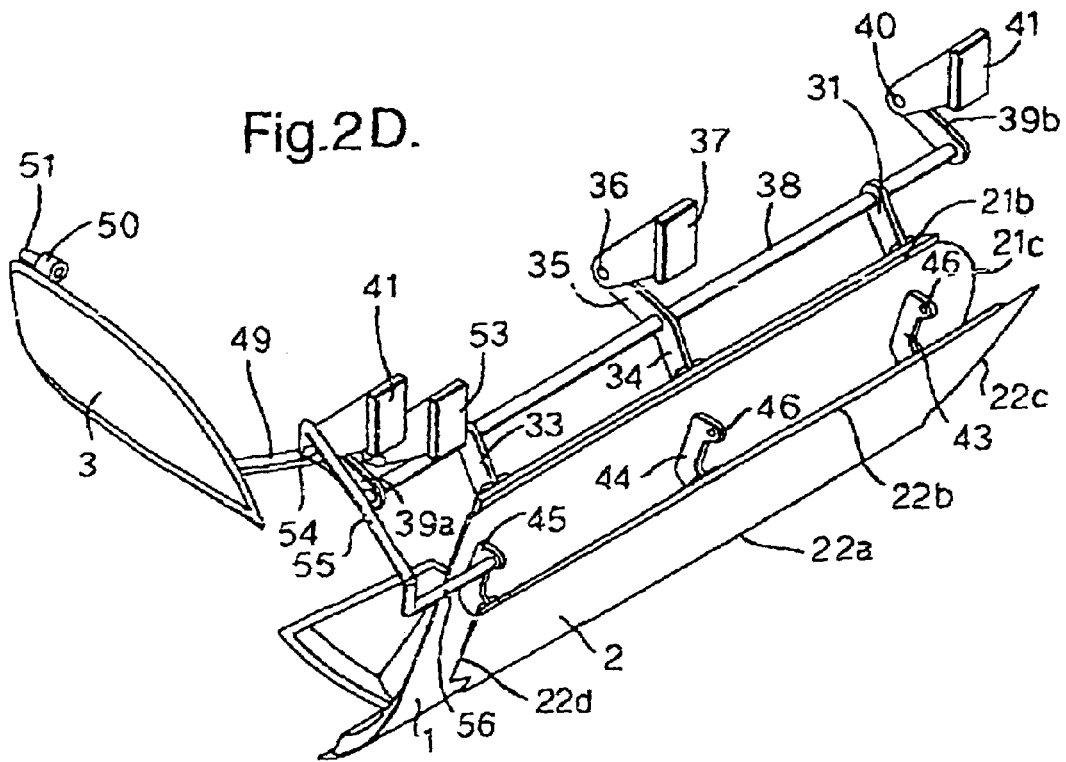
FIG. 2D is a perspective view from above and to the side and rear of the landing gear door assembly, similar to FIG. 1D but showing the assembly in art open position.

The fixed axis of rotation 13 of the transverse door 3 is above that of the fixed axis 12, as can be seen in FIG. 1A and is slightly to the inside of the straight edge 23*c* of the door. As can be seen by comparing the orientation of the door 3 in FIG. 1C and FIG. 2C, the door rotates through an angle of a little over 80 degrees when moving from its closed position to its open position. The transverse door 3 therefore moves upwardly and longitudinally away from the first and second doors as it opens and, in its fully open position, all of the transverse door is above the fixed axis of rotation 12 of the second door 2. Thus in its open position all of the transverse door is housed within the landing gear bay that is closed by the three doors 1, 2, 3 in their closed positions. Thus the existence of the transverse door has very little aerodynamic effect on the aircraft.

Figure 3A:
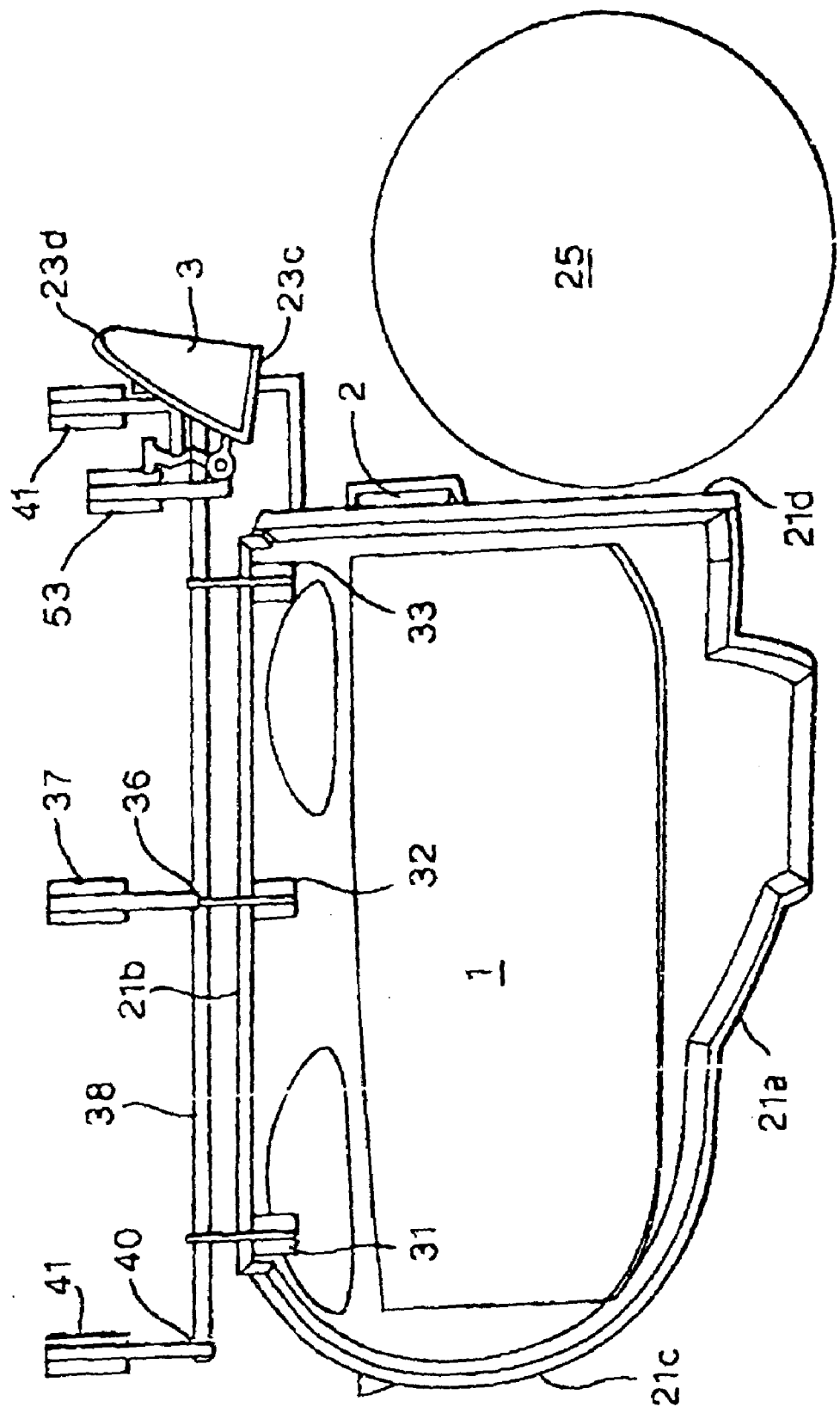
FIG. 3A is a side view of the landing gear door assembly in an open position, also showing the position of a pair of wheels of neighboring landing gear.
Figure 3B:
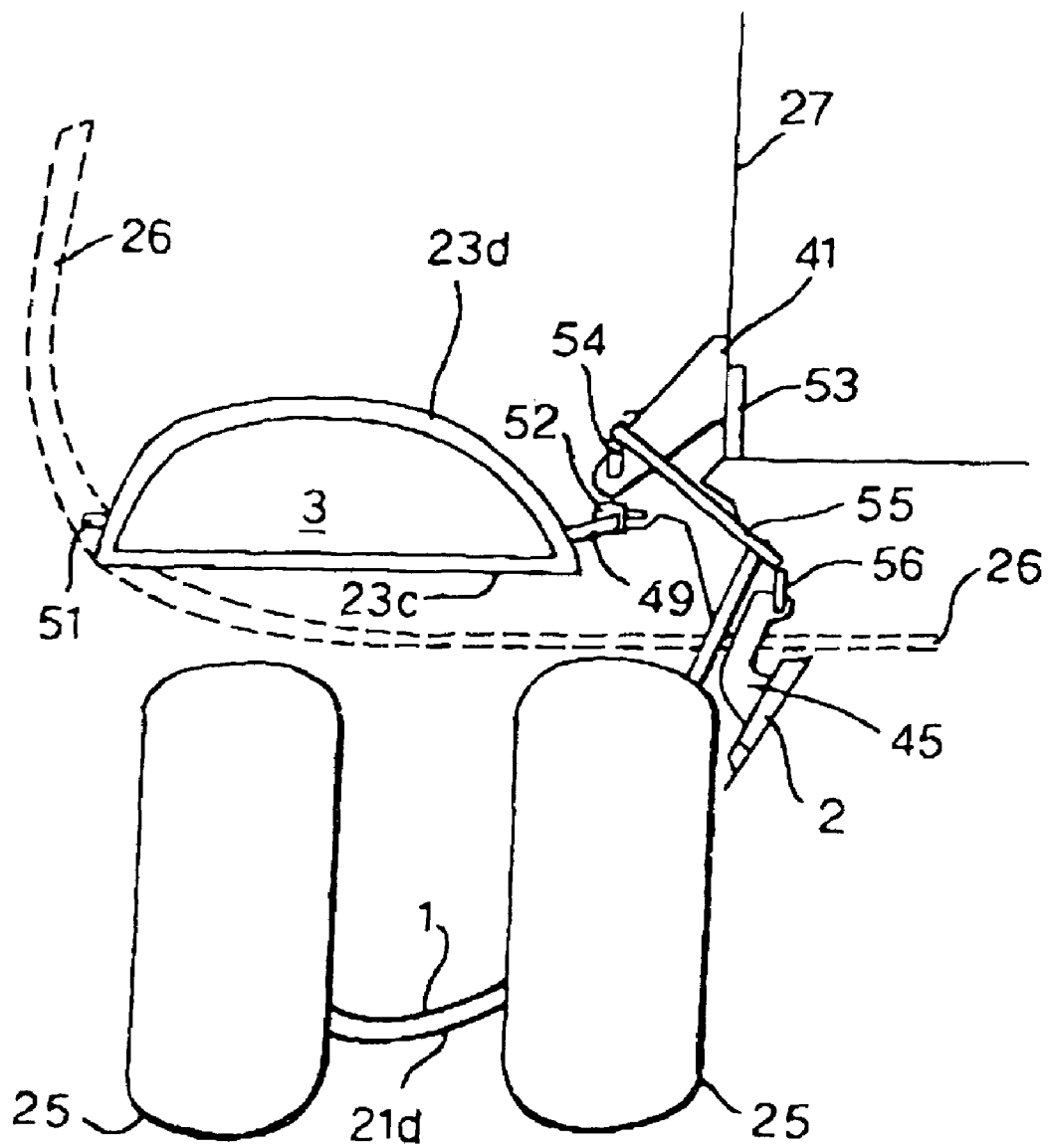
FIG. 3B is a partly sectional rear view of the landing gear door assembly in an open position, also showing the position of a pair of wheels of neighboring landing gear and showing part of the aircraft structure.

By providing such a transverse door the length of door extending downwardly from the aircraft when the doors are in their open position can be reduced and that may enable a neighbouring landing gear to be located closer to the described door assembly than would otherwise be the case FIGS. 3A and 3B illustrate this benefit schematically: wheels 25 of a neighbouring landing gear are shown. In FIG. 3B a skin structure 26 of an aircraft fuselage extending around the landing gear bay is shown as well as the outline of an internal fixed structure 27 within the fuselage. It can be seen from FIG. 3A that one of the wheels 25 is immediately adjacent to the edge 21*d* of the first door 1 when that door is in its open position. If the transverse door 3 were simply a part of the first door 1 that moved with the first door, then the door would interfere with the wheel 25. If the transverse door 3 were simply a fixed part of the aircraft structure then the length of the opening provided by the door assembly would be reduced, which would adversely affect deployment of the landing gear. By providing the transverse door, the opening can be lengthened without causing obstruction of the door assembly, when open, to neighbouring landing gear.

Having now described the doors, the axes about which they rotate and the positions that they adopt in their open and closed positions, the details concerning the mounting of the doors will be described.

The door 1 has three arms 31, 32 and 33 fixed to the inside face of the door at equispaced intervals along and adjacent to the side edge 21*b* of the door 1. The central arm 32 is formed of two angled portions 34, 35, the portion 34 being fixed to the door at its remote end and the portion 35 being rotatably connected at a connection 36 at its remote end to the distal end of a fixed mounting 37 which is fixed to the aircraft structure 27 (see FIG. 3B) inside the landing gear bay. Where the angled portions 34, 35 of each arm meet they are fixedly joined to the middle of a rod 38 which extends parallel to the side edge 21*b* of the door 1. The arms 31 and 33 are each fixed at one end to the door 1 and at the other end to the rod 38. The opposite ends of the rod 38 are fixedly joined to ends of respective links 39*a* and 39*b*, whose opposite ends are rotatably connected at connections 40 to the distal ends of respective fixed mountings 41 which are fixed to the aircraft structure 27 (see FIG. 3B) inside the landing gear bay. The rotatable connections 36 and 40 all lie on the axis of rotation 11 of the door 1 and thus the door 1 is mounted for rotation about the axis 11.

The door 2 has three arms 43, 44, 45 fixed to the inside of the door at equispaced intervals along and adjacent to the side edge 22*b* of the door 2. Each of the arms 43, 44, 45 is rotatably mounted at a respective connection 46, provided at its end remote from the door 2, to the distal end of a respective fixed mounting (not shown) fixed to the aircraft structure inside the landing gear bay. The rotatable connections 46 all lie on the axis of rotation 12 of the door 2 and thus the door 2 is mounted for rotation about the axis 12.

The door 3 has two arms 48, 49 fixed to the inside of the door adjacent to the straight edge 23*c* of the door. The arm 48 is rotatably connected at a connection 50 provided at its end remote from the door 3 to the distal end of a rod-shaped fixed mounting 51 which is fixed (see FIG. 3B) to the aircraft structure 26 inside the landing gear bay. The arm 49 is rotatably connected at a connection 52 provided at its end remote from the door 3 to the distal end of a fixed mounting 53 which is fixed to the aircraft structure 27 (see FIG. 3B) inside the landing gear bay. The rotatable connections 50 and 52 both lie on the axis of rotation 13 of the door 3 and thus the door 3 is mounted for rotation about the axis 13.

A linkage mechanism links the movement of the doors so as to synchronize the movements, as will now be described.

Firstly there is a linkage that synchronizes the movement of the second door 2 to the movement of the first door 1. That linkage comprises a first crank arm 54, a link rod 55 and a second crank arm 56. The first crank arm 54 is fixedly joined at one end to the link 39a at its connection 40 on the axis of rotation 11 of the door 1. The other end of the first crank arm 54 is rotatably connected to one end of the link rod 55. The second crank arm 56 is fixedly joined at one end to the arm 43 at its connection 46 on the axis of rotation 12 of the door 2. The other end of the second crank arm 56 is rotatably connected to the other end of the link rod 55. Thus, rotational movement of the first door 1 causes rotation of the first crank arm 54 which in turn, via the link rod 55, causes rotation of the second crank arm 56 and, with it, the second door 2. The amount of angular movement of the door 2 for a given angular movement of the door 1 is determined by the geometry of the linkage and especially the relative lengths of the cranks of the crank arms 54 and 56.

Figure 4:
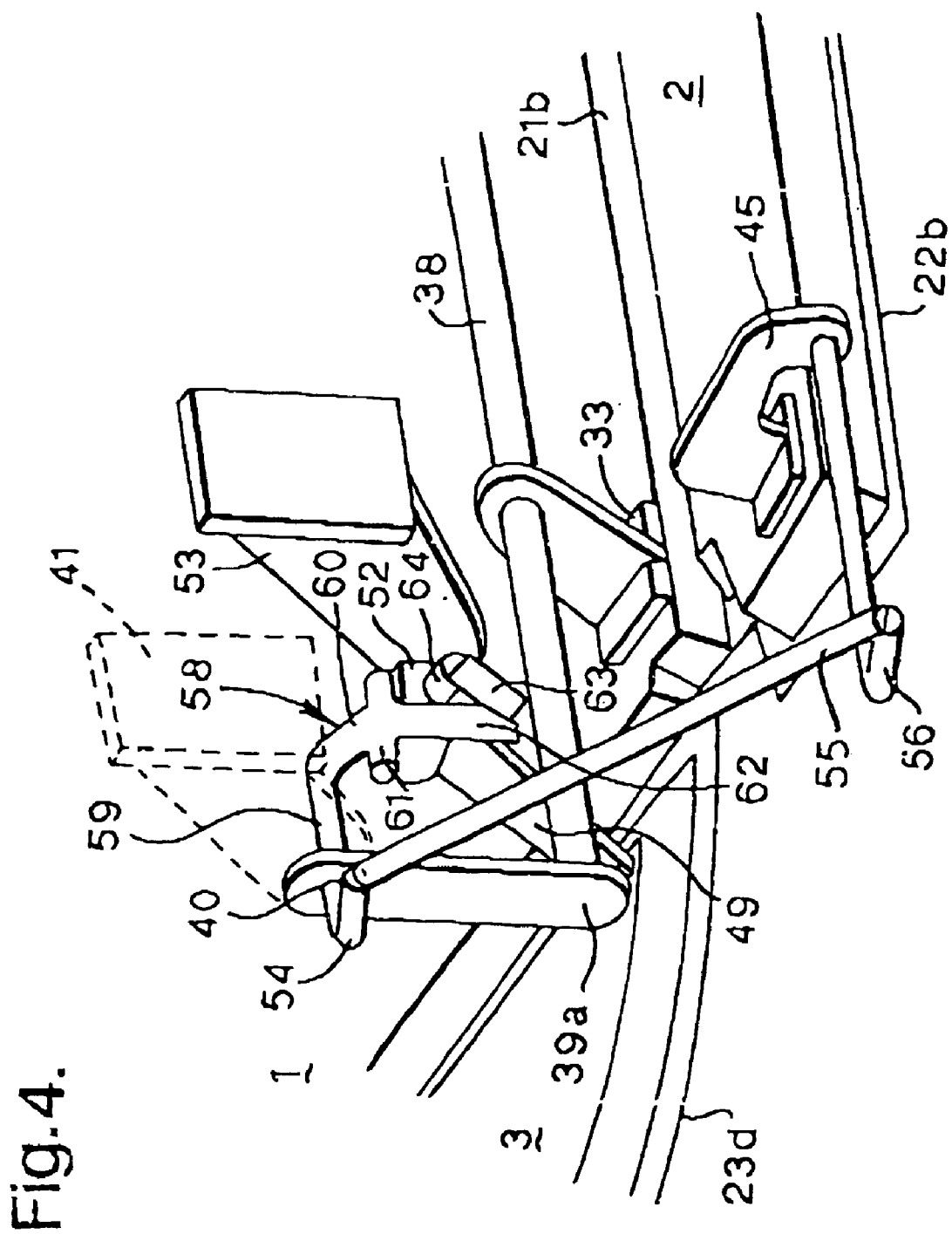
FIG. 4 is an enlarged perspective view of part of the door assembly as shown in FIG. 1D.

Secondly there is a linkage that synchronizes movement of the door 3 to the movement of the door 1. Referring now especially to FIG. 4, that linkage comprises a crank arm 58, a link rod 63 and a shaft 64. The crank arm 58 is fixedly joined via an end portion 59 to the link 39a at its connection 40 on the axis of rotation of the door 1 and, as can be seen in FIG. 4, is an extension of the crank arm 54. The crank arm 58, has a portion 60 extending at right angles to the end portion 59, a further cross-part 61, typically an universal joint, and an end portion 62. The cross-part 61 allows relative transverse movement of the end portion 62 and the arm 58. The end portion 62 is connected to the link rod 63 via a ball joint and the link rod 63 is in turn pivotally connected to one end of the shaft 64. The other end of the shaft 64 is fixedly connected to the arm 49 fixed to the transverse door, the shaft passing through a part of the fixed mounting 53 and being rotatably mounted therein to define the rotatable connection 52. Thus, rotational movement of the first door 1 causes rotation of the crank arm 58 which in turn via the link rod 63 causes rotation of the shaft 64 and, with it, the arm 49 and the transverse door 3. The amount of movement of the door 3 for a given movement of the door 1 is determined by the geometry of the linkage.

The movement of the door 1 is driven by a linear actuator, typically a hydraulic actuator, via a simple linkage. For the sake of clarity the drive arrangement is shown only in FIGS. 1A and 2A and is shown in dotted outline. A hydraulic actuator 69 with a piston 70 is pivotally connected at an upper end to the aircraft structure (not shown) and the distal end of the piston 70 is pivotally connected to a rod 71 fixed to the portion 35 of the central arm 32 of the door 1. Thus extending the actuator causes the door 1 to open and retraction of the actuator causes the door 1 to close.

It should be understood that the illustrated linkages for causing movement of the doors and synchronizing those movements are shown in a schematic form and serve to illustrate the principles involved rather than to show details of the mechanisms. Such linkages are well known per se.

Thus it can be seen that in the embodiment just described the three doors each rotate about fixed axes under the control of a single prime mover and with their individual movements being synchronized by a linkage connecting the movement of the first door to the movement of the second door and another linkage connecting the movement of the first door to the movement of the third door.

Figure 5:
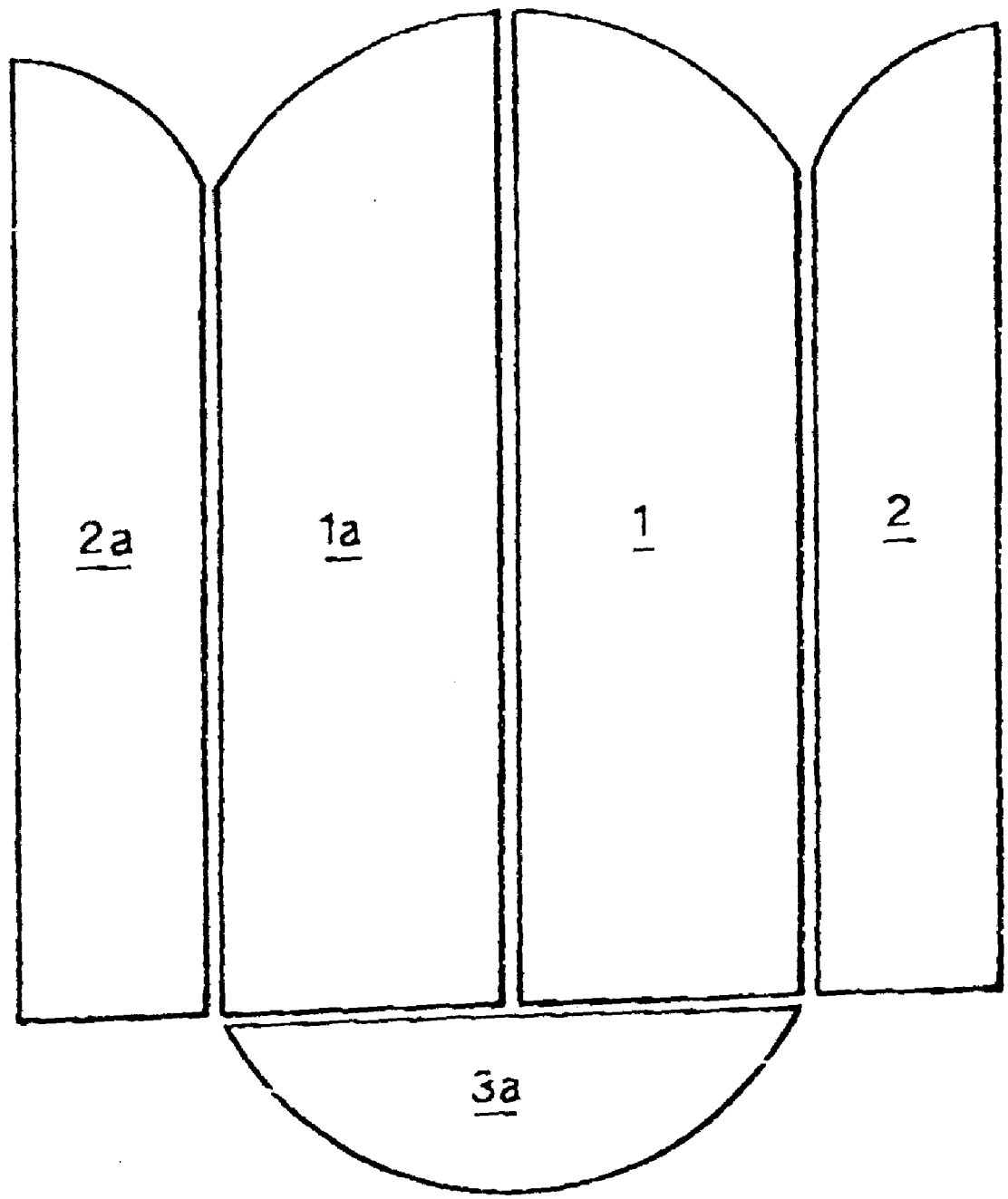
FIG. 5 is a diagrammatic plan view of a modified form of the door assembly, showing the assembly in a closed position.

Whilst in the embodiment of the invention described above the only doors that rotate about horizontal axes are on the same side of the aperture through which the landing gear is deployed, it will be understood that it is also possible to provide further doors on the opposite side of the aperture as a mirror image of the doors described above. In that case of course the size of the aperture is doubled. A further possibility is to provide a single transverse door common to the doors on opposite sides of the aperture. FIG. 5 shows such an arrangement, when closed, as a diagrammatic plan view. The arrangement comprises a first door 1, a second door 2, a third door 1a which together with the door 1 provides a pair of doors, a fourth door 2a which opens to allow passage of the door 1a in a manner similar to that in which the door 2 opens to allow passage of the door 1, and finally a transverse door 3a which functions in a manner similar to the transverse door 3 described above.

The invention claimed is:

1. An aircraft landing gear door assembly including a plurality of doors moveable between open positions, in which a landing gear can be deployed into an aircraft slipstream through an aperture in the aircraft, and closed positions, in which the doors are closed across the aperture, the plurality of doors including;
   a first door mounted for rotational movement between closed and open positions about a first generally longitudinal axis; and
   a transverse door mounted for rotational movement between closed and open positions about a generally horizontal axis that is transverse to the first generally longitudinal axis, wherein the transverse door is disposed out of said slipstream in the open position.

2. An assembly according to claim 1, in which the first door is mounted for fixed-axis rotational movement about the first generally longitudinal axis.

3. An assembly according to claim 1, in which the transverse door is mounted for fixed-axis rotational movement about the transverse generally horizontal axis.

4. An assembly according to claim 1, further including a linkage mechanism and a prime mover, the linkage mechanism connecting the plurality of doors to the prime mover such that the prime mover is effective to operate all the plurality of doors.

5. An assembly according to claim 4, in which the prime mover comprises a linear actuator, one stroke of the actuator in one direction being effective to move the doors from the closed positions to the open positions and one stroke of the actuator in the opposite direction being effective to move the doors from the open positions to the closed positions.

6. An assembly according to claim 1, in which the transverse door is aft of the first door.

7. An assembly according to claim 1, in which the plurality of doors include a second door moveable between closed and open positions, the second door being adjacent to the first door in the closed positions of the doors, the first door being so mounted that its rotational movement from its closed position to its open position involves movement of at least part of the first door through space which is occupied by the second door in its closed position and vacated by the second door in its open position.

8. An assembly according to claim 7, in which the second door is mounted for fixed-axis rotational movement about a second generally longitudinal axis.

9. An assembly according to claim 7, in which the first generally longitudinal axis is disposed at a location vertically spaced above the level of the aperture.

10. An assembly according to claim 9, in which the first generally longitudinal axis is disposed in a region overlying the locations of adjacent edges of the first and second doors when they are closed.

11. An assembly according to claim 1, in which the plurality of doors include a third door mounted for rotational movement between closed and open positions about a third generally longitudinal axis, the first and third doors defining a pair of doors on opposite sides of the aperture.

12. An assembly according to claim 11, in which the plurality of doors include a fourth door moveable between closed and open positions, the fourth door being adjacent to the third door in the closed positions of the doors, the third door being so mounted that its rotational movement from its closed position to its open position involves movement of at least part of the first door through space which is occupied by the fourth door in its closed position and vacated by the fourth door in its open position.

13. As assembly according to claim 12, in which the third door is mounted for fixed-axis rotational movement about a third generally longitudinal axis.

14. An assembly according to claim 12, in which the third generally longitudinal axis is disposed at a location vertically spaced above the level of the aperture.

15. An assembly according to claim 14, in which the third generally longitudinal axis is disposed in a region overlying the locations of adjacent edges of the third and fourth doors when they are closed.

16. An assembly according to claim 12, in which the fourth door is mounted for fixed-axis rotational movement about a fourth generally longitudinal axis.

17. An aircraft including a landing gear door assembly according to claim 1.

18. An aircraft according to claim 17, wherein a further landing gear which, when deployed, is adjacent to one end of the first door when in its open position, the transverse door being disposed adjacent to said one end of the first door when the doors are in their closed position.

* * * * *